United States Patent [19]

Bartrug et al.

[11] Patent Number: 5,089,687
[45] Date of Patent: Feb. 18, 1992

[54] BUS BAR JUMPER FOR HEATABLE WINDSHIELD

[75] Inventors: Bruce A. Bartrug, Lower Burrell; Harry S. Koontz; John A. Winter, both of Pittsburgh, all of Pa.

[73] Assignee: PPG Industries, Inc., Pittsburgh, Pa.

[21] Appl. No.: 591,917

[22] Filed: Oct. 2, 1990

[51] Int. Cl.⁵ .......................... H05B 3/26; H05B 3/84; H05B 3/10
[52] U.S. Cl. ................................... 219/203; 219/541; 219/543; 174/261
[58] Field of Search ...................... 219/203, 543, 541; 338/308, 309; 174/261

[56] References Cited

U.S. PATENT DOCUMENTS

| | | | |
|---|---|---|---|
| 3,287,684 | 11/1966 | Armbruster, Jr. | 219/543 |
| 3,560,256 | 2/1971 | Abrams | 174/261 |
| 3,789,191 | 1/1974 | Spindler | 338/24 |
| 3,789,192 | 1/1974 | Spindler | 219/522 |
| 3,790,752 | 2/1974 | Boaz et al. | 219/522 |
| 3,794,809 | 2/1974 | Beck et al. | 219/203 |
| 3,806,629 | 4/1974 | Cocca | 174/261 |
| 3,816,195 | 6/1974 | Hebenstreit | 174/261 |
| 3,982,092 | 9/1976 | Marriott | 219/203 |
| 4,543,466 | 9/1985 | Ramus | 219/203 |
| 4,610,771 | 9/1986 | Gillery | 204/192.1 |
| 4,786,784 | 11/1988 | Nikodem et al. | 219/543 |
| 4,808,799 | 2/1989 | Schave | 219/522 |
| 4,820,902 | 4/1989 | Gillery | 219/203 |
| 4,829,163 | 5/1989 | Rausch et al. | 219/547 |
| 4,940,884 | 7/1990 | Gillery | 219/203 |
| 4,994,650 | 2/1991 | Koontz | 219/203 |

Primary Examiner—C. L. Albritton
Assistant Examiner—John A. Jeffery
Attorney, Agent, or Firm—Gay Ann Spahn; Andrew C. Siminerio; Donald C. Lepiane

[57] ABSTRACT

A dual lead electrically heatable windshield is provided with an internal jumper arrangement that allows the bus bar having the dual lead to be powered by a single external connection to one of the dual leads. A jumper arrangement may also be used in combination with a crack detector for the dual lead heatable windshield.

17 Claims, 2 Drawing Sheets

BUS BAR JUMPER FOR HEATABLE WINDSHIELD

BACKGROUND OF THE INVENTION

1. Field of the Invention

This invention relates to a heatable, laminated transparency and in particular to an internal bus bar jumper arrangement to interconnect common leads in a dual feed heatable windshield.

2a. Technical Considerations

It has been known to pass electric current through a transparent conductive coating on a transparency in order to raise its temperature. Generally, the transparency includes a spaced pair of bus bars electrically interconnected by a conductive coating. The bus bars are usually connected by leads to a power source to distribute current from the power source through the coating. Where the transparency is a laminated windshield, passing current through the coating elevates the temperature of the laminate to a degree sufficient to melt snow or ice that has accumulated on an exposed surface of the windshield.

A heatable windshield usually includes a cut-out section, or notch area, along an edge of one of the plies of the windshield that exposes a lead portion of the bus bars and provides a location at which the power source can be connected to the windshield. The notch area must be sealed after electrical connection is made to the exposed leads to prevent moisture from entering the notch area, which in turn could short the windshield leads.

In a dual lead heatable windshield such as that taught in U.S. Pat. Nos. 4,820,902 and 4,940,884 to Gillery, current to at least one of the bus bars is supplied by two leads. A crack detector as taught in U.S. Ser. No. 07/444,206 to koontz, now U.S. Pat. No. 4,994,650 for a dual lead heatable windshield arrangement also requires two detector lines with two electrical connections. Generally, each of the electrical connections are made at the notch area. It would be advantageous to reduce the number of electrical connections required to power and monitor a dual lead heatable windshield.

2b. Patents of Interest

U.S. Pat. Nos. 3,789,191 and 3,789,192 to Spindler teach a heated window with an electroconductive film interconnecting a pair of opposing bus bars. Lead wires extend into the laminate to provide power to the window. Electrical leads to a windshield temperature sensor are embedded within the plastic interlayer of the window.

U.S. Pat. No. 3,790,752 to Boaz et al. teaches a heatable, laminated windshield in which an electrical connection is made within the windshield to a transparent interlayer which has a conductive coating thereon. The connection is sealed so that moisture cannot penetrate the laminate.

U.S. Pat. Nos. 3,794,809 Beck; 4,543,466 to Ramus; and 4,786,784 to Nikodem et al. teach an electrically heatable windshield with opposing bus bars that are electrically interconnected by an electroconductive coating on an interior surface of the windshield. In Beck, the leads to the bus bars extend outside of the windshield assembly. In Ramus and Nikodem et al., the leads extend into a cut-out portion, or terminal area, along an edge of the windshield. Electrical power is provided to the leads at the terminal area.

SUMMARY OF THE INVENTION

The present invention teaches a dual lead heatable windshield having an internal jumper arrangement to electrically interconnect the ends of the leads so that the upper bus bar can be powered by a single external power connection. An electroconductive member, such as a metal foil, is secured to the ends of the upper bus bar leads and an insulating member is positioned between the foil member and the underlying lead to the lower bus bar to prevent shorting of the heatable windshield's circuitry.

In one particular embodiment of the invention, the heatable windshield includes crack detector lines to detect any discontinuities in the bus bar and lead arrangement. An additional jumper member is used to electrically interconnect the ends of the crack detector lines so that the detector system can be monitored with a single lead extending from the windshield.

DETAILED DESCRIPTION OF THE INVENTION

The description of the invention is taught in connection with a heatable, laminated transparency comprised of two glass plies bonded together by a thermoplastic interlayer and having an electroconductive coating positioned between the plies. The preceding construction represents a typical heatable windshield construction, but it is understood that the invention is not limited to an automotive windshield but may be practiced with any type of construction where there is a need to reduce the number of external electrical connections made to the unit.

Figure 1:
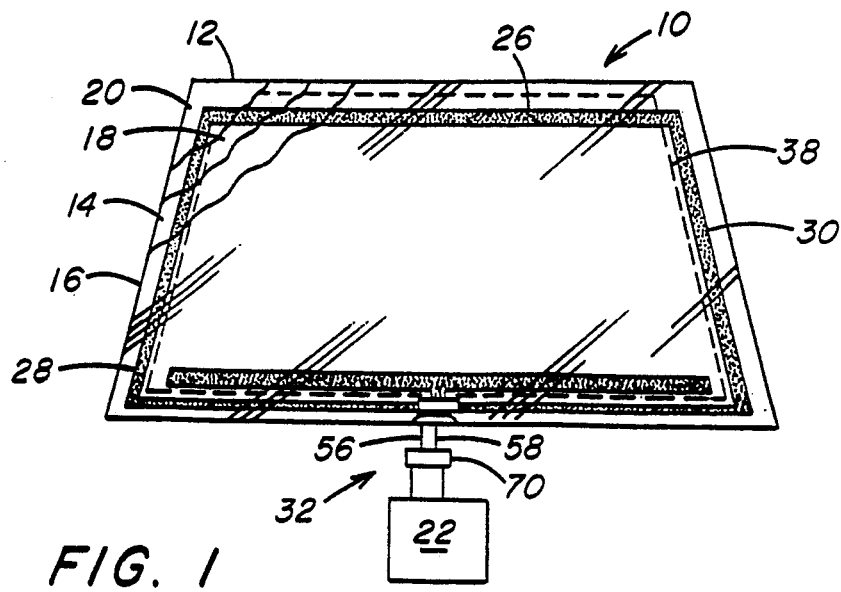
FIG. 1 is a plan view of a dual lead, heatable windshield, incorporating features of the present invention.
Figure 2:
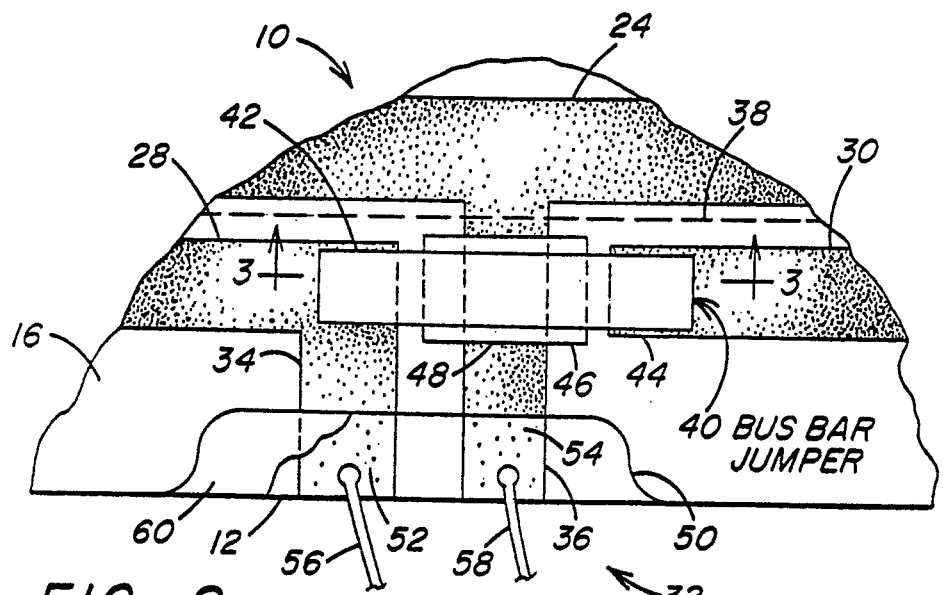
FIG. 2 is an enlarged view of the notch area of the windshield shown in FIG. 1, with portions removed for clarity.
Figure 3:
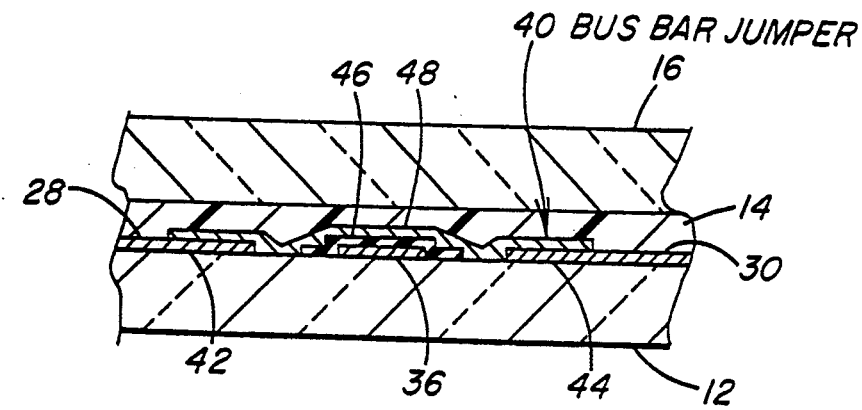
FIG. 3 is a view taken along line 3—3 of FIG. 2 showing the jumper bar arrangement of the present invention.

Referring to FIGS. 1 through 3, the transparency 10 is a heatable windshield which includes an outboard glass ply 12, i.e. the ply furthest from the vehicle interior, a plastic interlayer 14 (shown in FIGS. 1 and 3 only), which may be polyvinyl butyral as is commonly used for laminated windshields, and an inboard glass ply 16. Although not limiting in the present invention, in the preferred embodiment of the invention, the windshield 10 has a heating arrangement including an electroconductive coating 18 preferably positioned on the inside surface 20 of the outboard glass ply 12. Various coatings may exhibit the necessary combination of transparency and electroconductivity required to serve as the heating element for the transparency 10. A preferred coating is similar to that disclosed in U.S. Pat. No. 4,610,771 to Gillery, which teachings are hereby incorporated by reference. These coatings generally include one or more silver films between pairs of zinc stannate films, each of which may be applied sequentially by magnetron sputtering. In one particular embodiment of the invention, the coating taught in U.S. Pat. No. 4,610,771 exhibits an approximate resistivity of about 7 to 8 ohms per square with a single silver film layer having a thickness of about 110 Angstroms.

Electrical power from a power supply 22 passes to the electroconductive coating 18 through a bus bar and lead arrangement which, although not limiting in the present invention, is similar to the double feed bus bar arrangement disclosed in U.S. Pat. No. 4,820,902 to Gillery, which teachings are incorporated by reference. Referring to FIG. 1, a bottom bus bar 24 and top bus bar 26 are positioned along surface 20 of the glass ply 12 in contact with the coating 18. The electrical connection to the upper bus bar 26 is made by a pair of extensions of the bus bar 26, i.e. leads 28 and 30, each extending along opposing side portions and bottom edge of the windshield 10 to a terminal area 32. Lead 28 further includes an extending portion 34 which extends to the edge of the outer glass sheet 12 of windshield 10 at the terminal area 32 as will be discussed later in more detail. Electrical access to the bottom bus bar 24 is had by a lead 36 which extends from the bus bar 24 to the edge of sheet 12 at the terminal area 32. Although not limiting in the present invention, the terminal area 32 is preferably along the bottom edge of the windshield 10 as illustrated in FIGS. 1 and 2, but it should be appreciated that it may be located at any convenient location about the periphery of the windshield 10.

The leads 28 and 30 are electrically insulated from the coating 18 and bottom bus bar 24 in any convenient manner known in the art to ensure that the power to the coating 18 is delivered only through the bus bars 24 and 26. Although not limiting in the present invention, the edge of the coating 18 is spaced from the edge of the transparency 10, as indicated by line 38 in FIGS. 1 and 2 and the leads 28 and 30 are positioned within this uncoated, marginal area.

The bus bars and leads are preferably made of a silver containing ceramic frit material, as is well known in the art, and may be applied in any convenient manner, e.g. screen printing onto the glass surface 20 of the glass ply 12. After printing, the frit material is heated, or "fired", to melt the frit material and fuse it onto the glass surface. An opaque ceramic enamel border (not shown) may optionally be applied on surface 20 of the glass ply 12 to hide portions or all of the bus bars 24 and 26 and leads 28 and 30.

After the bus bars and leads are fired onto the glass ply 12 and the coating 18 is applied to surface 20, a bus bar jumper member 40 is applied to glass sheet 12 as shown in FIGS. 2 and 3. In particular, jumper member 40 is an electroconductive member that electrically interconnects end 42 of lead 28 with end 44 of lead 30. The size of the jumper member 40 depends in part on the amount of current that passes through it to power the upper bus bar 26. In one particular heatable windshield configuration, 20 amperes of current is provided to the upper bus bar 26 so that 10 amperes, i.e. half the total current, is delivered through each lead 28 and 30, provided that each bus bar lead is fully functional. If one of the leads breaks and the windshield 10 continues to function, the jumper member 40 must be able to carry the full current load to the upper bus bar 26. Although not limiting in the present invention, a ⅜ inch × 4 inch × 0.0035 inch (0.95 cm × 10.16 cm × 0.09 mm) thick copper strip secured to ends 42 and 44 by a conductive adhesive (not shown) was used as the jumper member 40 for the 20 ampere current load discussed above. Because the jumper member 40 in the particular embodiment shown in FIGS. 2 and 3 extends across lead 36 of the lower bus bar 24, a dielectric material 46, such as but not limited to electrical tape or polyester tape, is positioned between the lead 36 and the central portion 48 of the jumper member 40 to prevent electrical shorting of the power supply to the windshield 10. In a preferred jumper member 40 arrangement, the conductive adhesive is applied to the lower surface of the copper strip and the insulating tape 46 is secured directly to the central portion 48 of the strip such that the jumper member 40 resembles an adhesive bandage. With this type of configuration, the jumper member 40 may be applied in a single operation.

After the jumper member 40 is secured in place to electrically interconnect leads 28 and 30, the interlayer 14 is positioned between the glass sheets 12 and 16 and the entire assembly is laminated in any convenient manner available in the art, to form a unitary structure, i.e. a laminated windshield 10.

With particular reference to FIG. 2, inner ply 16 includes a cut-out or notch area 50 to expose portion 52 of lead 34 and portion 54 of lead extension 34 and provide access for electrical connection to the bus bars 24 and 26 from the power source 22 (shown only in FIG. 1). In particular, referring to FIG. 2, wires 56 and 58 are electrically interconnected to lead portions 52 and 54, respectively, in any convenient manner known in the art, e.g. soldering. A sealant 60 is used to fill the notch area 50 to protect the notch area 50 against the environment. Although not limiting in the present invention, the sealant 60 is preferably applied before lamination as disclosed in U.S. Ser. No. 07/375,090 to Winter et al. and is preferably a flexible epoxy material as disclosed in U.S. Ser. No. 07/456,711 to Winter et al., both of which are hereby incorporated by reference.

Although not limiting in the present invention, in the preferred embodiment as shown in FIG. 2, the jumper member 40 is positioned above the notch area 50 so that it is between the glass plies 12 and 16 after assembly and lamination of the windshield 10. As an alternative, lead 30 can include an additional extension (not shown) that extends into the notch area 50 so that jumper 40 can be placed and sealed within the notch area 50.

With continued reference to FIG. 1, wires 56 and 58 are connected to an electrical harness 70 which connects the bottom bus bar 24 to one pole of an electrical power source 22 and the top bus bar 26 to the opposite pole of power source 22.

The bus bar jumper member 40 as taught in the present disclosure provides an arrangement whereby the leads 28 and 30 to bus bar 26 are interconnected within the windshield 10 such that bus bar 26 can be powered through a single external wire 56. This in turn eliminates the need to have a third wire secured to lead 30 at the notch area 50 as well as simplify the design of the electrical harness 70 that interconnects the wires of the heatable windshield 10 to the external power source 22.

Figure 4:
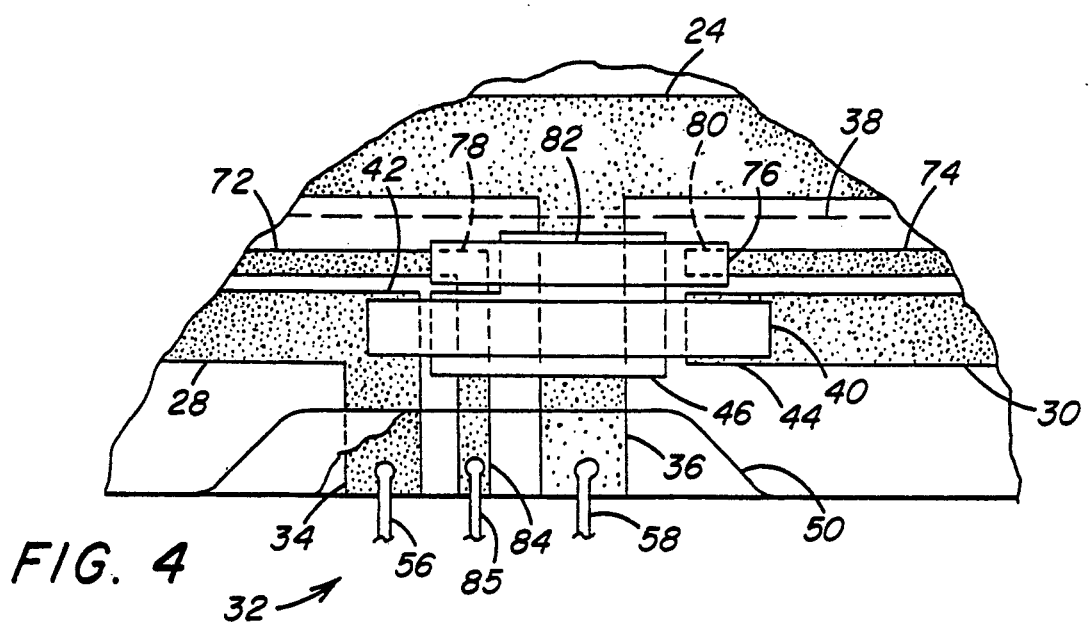
FIG. 4 is a view similar to FIG. 2 incorporating the present invention in a windshield having crack detector leads.

It should be appreciated by those skilled in the art that based in these teachings, a similar internal jumper arrangement may be used in a heatable windshield that has a crack detector as taught in U.S Ser. No. 07/444,206 to Koontz, which teachings are hereby incorporated by reference. Referring to FIG. 4, detector lines 72 and 74, rather than having individual external leads, have a detector line jumper member 76 that electrically interconnects ends 78 and 80 of line 72 and 74, respectively. To prevent shorting of the windshield 10 due to the jumper member 76 extending over lead 36 of lower bus bar 24, dielectric tape 46 is extended under the central portion 82 of the jumper member 76. Extending portion 84 extends from end 78 of line 72 into the notch area 50 to provide electrical access to the crack detector arrangement. Wire 85 electrically interconnects extending portion 84 with harness 70 (shown in FIG. 1 only). As an alternative, a separate electrically insulating member (not shown) may be used to electrically insulate jumper 76 from lead 36 to lower bus bar 24. In addition, if detector lines 72 and 74 are positioned outside of leads 28 and 30 as disclosed in U.S. Pat. Nos. 4,808,799 to Schave and 4,829,163 to Rausch et al., the electrically insulating tape 46 would also have to be positioned under central portion 82 of jumper 76 to electrically insulate jumper 76 from lead 34.

Figure 5:
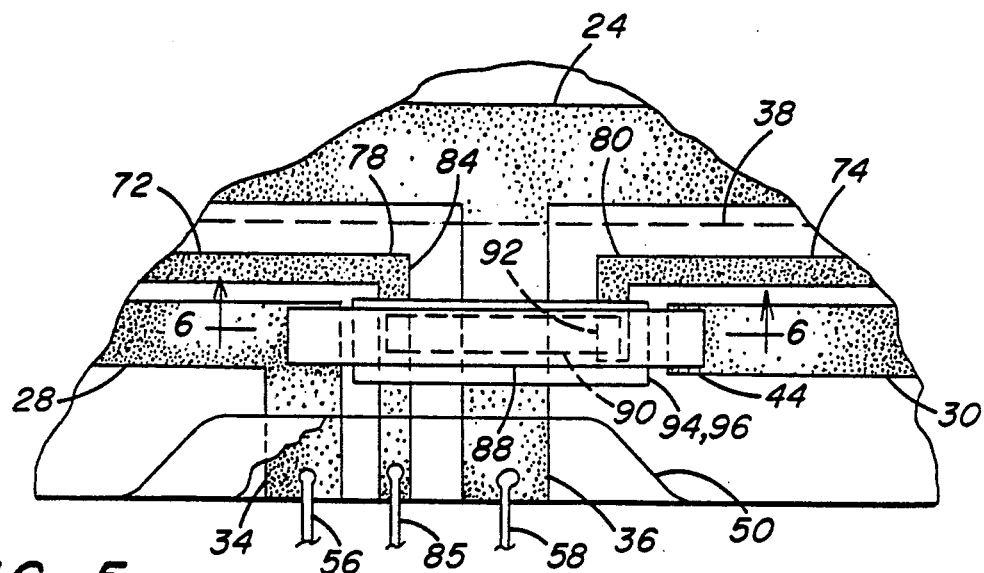
FIG. 5 is a view similar to FIG. 4 showing an alternate embodiment of the invention
Figure 6:
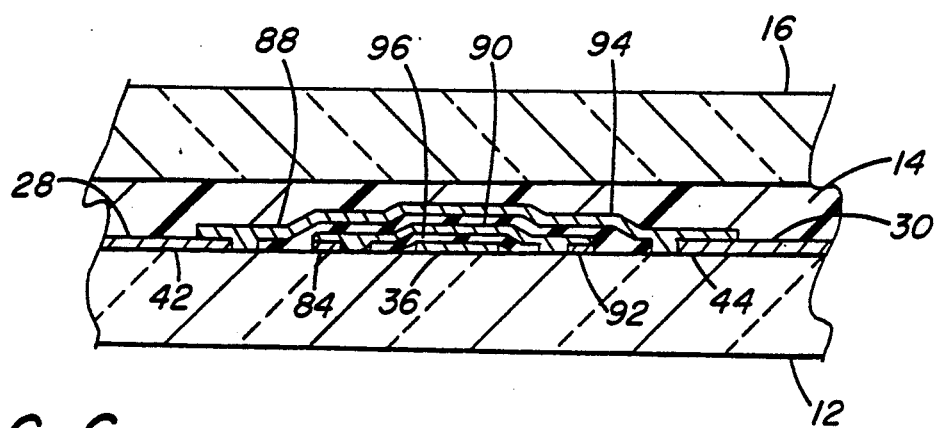
FIG. 6 is a view taken along line 6—6 of FIG. 5 showing a single jumper bar for both the dual power leads and the crack detector.

If desired, the two jumpers 40 and 76 can be combined into a single unit with jumpers 40 and 76 secured to tape 46 so that the combined jumper can be applied in a single step. In addition, the two jumper members may also be combined into a single jumper member. Referring to FIGS. 5 and 6, jumper member 86 is a multilayered member including an electrically conductive member 88 that electrically interconnects end 42 of bus bar lead 28 with end 44 of bus bar lead 30, an electrically conductive member 90 that electrically interconnects extension 84 at end 78 of detector line 72 with extension 92 at end 80 of detector line 74, and insulating member 94 that electrically insulates bus bar jumper member 86 from detector line jumper member 88, and an insulating member 96 that electrically insulates member 88 (as well as the remaining overlying members) from lead 36 to lower bus bar 24. The lower surface of electrically conductive members 88 and 90 are preferably provided with an electrically conductive adhesive (not shown) as discussed earlier to secure the individual members of the jumper 86 together into a unitary structure as well as provide the means for securing the ends of the members 88 and 90 to the bus bar leads and crack detector lines, respectively. Although the embodiment shown in FIGS. 5 and 6 shows the crack detector lines between the bus bar leads, it is obvious that a similar arrangement may be used when the crack detector lines are positioned outside of the leads, The forms of the invention shown and described in this specification represents illustrative preferred embodiments and it is understood that various changes may be made without departing from the spirit of the invention as defined in the following claimed subject matter.

We claim:

1. In a transparency of the type including a pair of dielectric substrates designated as a first dielectric substrate and a second dielectric substrate, the first dielectric substrate having a transparent electroconductive member on a major surface, a first bus bar in contact with said member adjacent a first edge portion of said first substrate, a lead extending from said first bus bar to a terminal are positioned along said first edge portion, a second bus bar spaced from said first bus bar and in contact with said member, electroconductive extensions electrically insulated from said member and extending from each end of said second bus bar to said terminal area with ends of said extensions being positioned on either side of said lead at said terminal area, and the second dielectric substrate overlaying said major surface of said first substrate while providing an exposed portion of the terminal area to provide access to said terminal area wherein each of the electroconductive extensions are capable of carrying sufficient electrical power to the second bus bar to, in cooperation with the first bus bar, power the electroconductive member in the event one of the electroconductive extensions becomes electrically non-conductive, the improvement comprising:

the end of said lead from said first bus bar and the end of one of the electroconductive extensions each terminating in the exposed portion of the terminal area with the end of the other electroconductive extension terminating short of the exposed portion of the terminal area;

means in the unexposed portion of the terminal area positioned above said lead from said first bus bar electrically interconnecting said ends of said extensions, said electrical interconnecting means capable of carrying said sufficient electrical power in case the extensions having the end in the unexposed portion of the terminal area becomes electrically non-conductive; and means electrically insulating said interconnecting means from said lead from said first bus bar.

2. The transparency as in claim 1 wherein said electroconductive member is a transparent electroconductive coating.

3. The transparency as in claim 2 further including a first electrical connector connected to the end of said lead of said first bus bar and to said end of said electroconductive extension at said exposed portion of said terminal area.

4. The transparency as in claim 1 wherein said interconnecting means is a metallic foil.

5. The transparency as in claim 1 wherein said insulting means is a dielectric tape.

6. The transparency as in claim 1 further including crack detector lines extending from said terminal area adjacent at least a portion of each of said second bus bar extensions, wherein an end of each of said detector lines is positioned on either side of said lead in the unexposed portion of the terminal area with the end of one of the detector lines extending into the exposed portion of the terminal area, means in the unexposed portion of the terminal area electrically interconnecting said ends of said detector lines and means electrically insulating said crack detector interconnecting means from said lead.

7. the transparency as in claim 6 further including me*ans to electrically insulate said detector line ends interconnecting means from said ends of said electroconductive extensions extending from said second bus bar.

8. The transparency as in claim 6 further including means to electrically insulate said means electrically interconnecting said ends of said extensions of said second bus bar from said detector line ends.

9. The transparency as in claim 6 wherein said extension ends interconnecting means is a first metallic foil strip, said detector line ends interconnecting means is a second metallic foil strip, said extension ends insulating means is a first dielectric tape strip, and said detector line ends insulating means is a second dielectric tape strip and further wherein said detector line ends are on each side of said lead from said first bus bar with said ends of said extensions from said second bus bar on each side of said lead between said lead and detector line ends and said second tape strips, said second tape strip overlays said first foil strip and a portion of said extension ends electrically insulating said second foil strip from said extension ends, said lead, and said first foil strip, and said second foil strip overlays said second tape strip and electrically interconnects said detector line ends.

10. The transparency as in claim 6 wherein said detector line ends interconnecting means is a first metallic foil strip, said extension ends interconnecting means is a second metallic foil strip, said detector line ends insulating means is a first dielectric tape strip, said extension ends insulating means is a second dielectric tape strip and further wherein said ends of said extensions from said second bus bar are on each side of said lead from said first bus bar and said detector line ends are on each side of said lead between said detector line ends and said lead, said first tape strip overlays a portion of said lead to electrically insulate said first foil strip from said lead, said first foil strip overlays said first tape strip and electrically interconnects said detector line ends, said second tape strip overlays said first foil strip and a portion of said detector line ends to electrically insulate said second foil strip from said detector line ends, said lead, and said first foil strip, and said second foil strip overlays said second tape strip and electrically interconnects said extension ends.

11. In a method of forming a dual lead heatable transparency including the steps of providing a transparent electroconductive member on a portion of a first major surface of a first dielectric substrate, providing a first bus bar in contact with said member adjacent a first edge portion of said substrate, extending a lead from said first bus bar to a terminal area positioned adjacent said first edge portion, providing a second bus bar spaced from said first bus bar and in contact with said member, providing electroconductive extensions electrically insulated from said member and extending from each end of said second bus bar with ends of said extensions removed from said second bus bar being positioned on either side of said first lead at said terminal area wherein each of the electroconductive extensions are capable of carrying sufficient electrical power to the second bus to, in cooperation with the first bus bar, power the electroconductive member in event one of the electroconductive extensions becomes electrically non-conductive, and securing a second dielectric substrate to said major surface of said first substrate to overlay said major surface of said first substrate while providing an exposed portion of the terminal area to providing access to said terminal area, the improvement comprising the steps of:

locating the ends of the leads from said first bus bar and the end of one of the electroconductive extensions in the exposed portion of the terminal area and the end of the other one of the electroconductive extensions in the unexposed portion of the terminal area short of the exposed portion of the terminal area;

providing an electrical insulating coating over portions of said lead in the unexposed portion of the terminal area;

providing electrical interconnecting means overlaying said insulating coating which is capable of carrying sufficient electrical power in the event the extension having the end in the terminal area becomes electrically non-conductive; and prior to said securing step, positioning the electrical interconnecting means to interconnect the ends of said extension in the unexposed portion of the terminal area.

12. The method as in claim 11 wherein said step of providing a transparent electroconductive member includes the step of coating a portion of the first major surface of the first dielectric substrate with an electroconductive coating.

13. The method as in claim 12 further including the steps of providing crack detector lines extending from said terminal area along at least a portion of each of said second bus bar extensions, wherein an end of each of said detector lines is positioned on either side of said lead, electrically interconnecting said ends of said detector lines in the unexposed portion of the terminal area and electrically insulating said crack detector line ends interconnecting means from said lead.

14. The method as in claim 13 further including the step of electrically insulating said detector line ends interconnecting means from said extension ends wherein said ends of said extensions from said second bus bar are on each side of said lead from said first bus bar and said detector line leads are on each side of said lead between said detector line end and said lead.

15. The method as in claim 13 further including the step of electrically insulating said extension ends interconnecting means from said detector line ends wherein said detector line ends are on each side of said lead from said first bus bar with said ends of said extensions from said second bus bar on each side of said lead between said lead and detector line ends and said second tape strips.

16. In a transparency of the type including a pair of dielectric substrates designated as a first dielectric substrate and a second dielectric substrate, the first dielectric substrate having a transparent electroconductive member on a major surface, a first bus bar in contact with said member adjacent a first edge portion of said first substrate, a lead extending from said first bus bar to a terminal area positioned along said first edge portion, a second bus bar spaced from said first bus bar and in contact with said member, electroconductive extensions electrically insulated from said member and extending from each end of said second bus bar to said terminal area with ends of said extensions being positioned on either side of said lead at said terminal area, and the second dielectric substrate overlaying said major surface of said first substrate while providing an exposed portion of the terminal area to provide access to said terminal area, the improvement comprising:

the end of said lead from said first bus bar and the end of one of the electroconductive extensions terminating in the exposed portion of the terminal area with the end of the other electroconductive extension terminating short of the exposed portion of the terminal area;

crack detector lines extending from said terminal area adjacent at least a portion of each of said second bus bar extensions wherein an end of each of said detector lines extends into the exposed portion of the terminal area;

means in the unexposed portion of the terminal area electrically interconnecting said ends of said detector lines; and means electrically insulating said crack detector interconnecting means from said lead.

17. The transparency of claim 16 further including means in the unexposed portion of the terminal area positioned above said lead from said first bus bar to electrically interconnecting said ends of said extensions wherein each of said electroconductive extensions are capable of carrying sufficient electrical power across the interconnecting means to the second bus bar to, in cooperation with the first bus bar, power the electroconductive member in event one of said electroconductive extensions becomes electrically non-conductive and means electrically insulating interconnecting means from said lead from said first bus bar.

* * * * *

UNITED STATES PATENT AND TRADEMARK OFFICE
CERTIFICATE OF CORRECTION

PATENT NO. : 5,089,687

DATED : February 18, 1992

INVENTOR(S) : Bruce A. Bartrug et al

It is certified that error appears in the above-identified patent and that said Letters Patent is hereby corrected as shown below:

Column 5, line 62, "are" should be --area--.

Column 6, line 37, "insulting" should be --insulating--.

Column 6, line 51, "me*ans" should be --means--.

Column 7, line 19, "to" should be deleted.

Column 7, line 19, "insulate" should be --insulating--.

Column 7, line 23, "to" should be deleted.

Column 8, line 67, "to" should be added.

Signed and Sealed this

Twenty-fifth Day of January, 1994

Attest:

BRUCE LEHMAN

*Attesting Officer*     *Commissioner of Patents and Trademarks*